N. L. Shaw,
Wire Fence,
No. 77,109.   Patented Apr. 21, 1868.

Witnesses
W. J. Chamberlain
Wilton H. Becker

Inventor
N. Lawrence Shaw

United States Patent Office.

N. LAWRENCE SHAW, OF WILSON, NEW YORK.

Letters Patent No. 77,109, dated April 21, 1868.

IMPROVEMENT IN FENCES.

*The Schedule referred to in these Letters Patent and making part of the same.*

TO WHOM IT MAY CONCERN:

Be it known that I, N. LAWRENCE SHAW, of Wilson, in the county of Niagara, in the State of New York, have invented a new and improved Fence; and I do hereby declare that the following is a full and exact description of the same, reference being had to the accompanying drawings, and to the letters of reference marked thereon—

Figure 1:
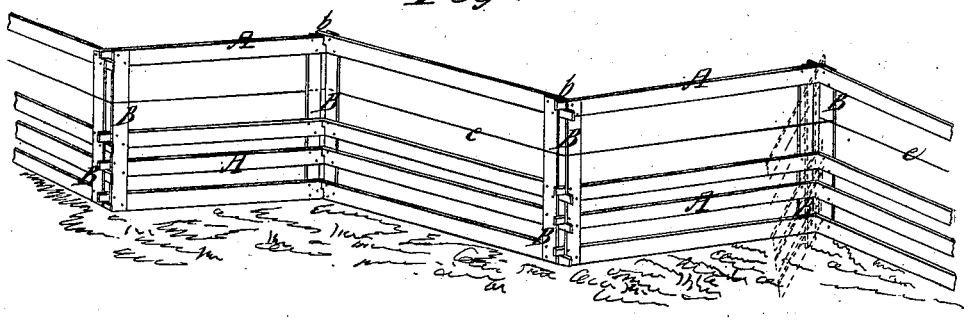

Figure 1 being a perspective view, and

Figure 2:
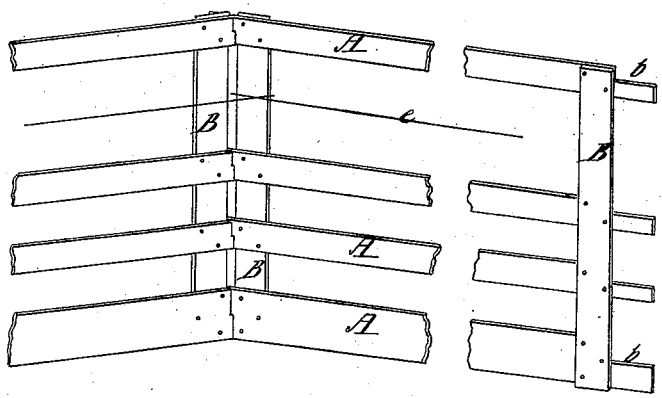

Figure 2 being an enlarged view of the intersection of two sections, the said drawings making a part of this specification.

My invention consists in making a fence in sections, which are used in connection with one or more wires, running lengthwise of such sections, and strained so as to hold each section in its place, and the whole fence firmly together, said wire or wires forming a part of the fence.

In the drawings, A A represent the boards, of any suitable length, for forming the panels. B B, two cross-pieces, nailed or otherwise secured to the panels near each end.

These panels are designed to be arranged in zigzag form, with the ends of the boards preferably rebated, as shown at $b$ $b$, to permit their interlocking, although they may be connected in any other suitable manner.

When thus arranged, the panels are secured in place by one or more wires, $e$, running longitudinally and passing around the corners or intersection of the panels, and then tightened by any suitable means, although I prefer the following method as the simplest and best, viz, by giving the wire, after it has passed around one or more corners, a turn across the angle and around one of the cross-pieces, B, of the advance panel, which is arranged so as to make a lesser angle with the adjacent one, as shown in red lines. This being done, the panel, in bringing it into its proper position, operates as a lever to tighten the wire, and thereby firmly secure the panels together.

These wires, by being arranged between the boards forming the panels, will dispense with the use of one or more of said boards, and thus considerably lessen the cost of the fence. Notches, $m$ $m$, may be formed at the corners of the cross-pieces B, so as to insure the wires being retained in their proper relative position.

What I claim as my invention, and desire to secure by Letters Patent, is—

The combination of the fence-panels A A with the wire or wires $e$, applied substantially in the manner and for the purpose specified.

N. LAWRENCE SHAW.

Witnesses:
FRANCIS HANER,
ALBERT C. SHAW.